United States Patent [19]

Adolph et al.

[11] 4,362,914
[45] Dec. 7, 1982

[54] ELECTRICAL SWITCH APPARATUS

[75] Inventors: Erich Adolph, Frankfurt am Main; Ünal Bayrak, Bischofsheim; Robert Prohl, Nidderau; Walter Stecker, Heusenstamm, all of Fed. Rep. of Germany

[73] Assignee: Siemens Aktiengesellschaft, Munich, Fed. Rep. of Germany

[21] Appl. No.: 162,433

[22] Filed: Jun. 24, 1980

[30] Foreign Application Priority Data

Jul. 6, 1979 [DE] Fed. Rep. of Germany ....... 2927466

[51] Int. Cl.³ ............................................ H01H 33/66
[52] U.S. Cl. .............................. 200/144 B; 200/148 R
[58] Field of Search ......................... 200/144 B, 148 R

[56] References Cited

U.S. PATENT DOCUMENTS 4,297,553 10/1981 Kawaguchi et al. ........... 200/144 B

Primary Examiner—Robert S. Macon
Attorney, Agent, or Firm—Kenyon & Kenyon

[57] ABSTRACT

Disclosed is an electrical switch apparatus of the type having a metal encapsulation formed in part by a tank which is filled with an insulating gas and in which is disposed at least one vacuum switching tube per phase. The switch apparatus includes a substructure common to all phases and an attachment common to all phases having sidewalls, and a top. The attachment is supported by the substructure at the top thereof. A feed-through plate is fastened on the top of the attachment on which the tank is supported. The top of the attachment is arranged between the sidewalls of the attachment so it could be moved relative to the sidewalls together with the tank and other parts supported by it and removed from the attachment. In the disclosed embodiment, the top of the attachment can be lowered and subsequently removed from the attachment through the front side thereof.

12 Claims, 1 Drawing Figure

ELECTRICAL SWITCH APPARATUS

BACKGROUND OF THE INVENTION

The present invention relates to electrical switch apparatus of the type which includes a substructure, an attachment mounted on the substructure and a metal encapuslated switch section filled with an insulating gas which is coupled through the attachment to the substructure.

OBJECTS OF THE INVENTION

It is an object of the present invention to facilitate maintenance of electrical switch apparatus of the aforementioned type.

It is another object of the invention to facilitate assembly of switch apparatus of the aforementioned type.

An electrical switch apparatus which includes a substructure common to all phases, an attachment common to all phases having sidewalls and a top, and which is supported by the substructure at the top thereof, and a tank forming part of a metal encapsulation filled with an insulating gas in which is disposed at least one vacuum switching tube per phase, means are provided in accordance with the invention for detachably connecting the top of the attachment, through which the vacuum tube is electrically coupled to the interior of the substructure, to the sidewalls of the attachment.

In accordance with the invention, the attachment top through which electrical terminal means connected to the vacuum switching tube extend, can be lowered within and/or moved between the attachment sidewalls. Further in accordance with the invention, the attachment top can be moved into and out of the attachment in a transverse direction relative to the sidewalls, i.e., through the front of the attachment. The attachment top can be inserted into the attachment and detachably fastened to the attachment sidewalls.

In the disclosed embodiment, the attachment top includes edges which extend downwardly, i.e., parallel to the axis of the vacuum tube, and the sidewalls include edges which extend inwardly at a right angle to the sidewalls and to the downwardly-extending edge of the attachment top, the sidewall edges extending over the top.

Further in accordance with the invention, fastener means are provided for detachably fastening the sidewall edges to the top or for fastening the top edge to the sidewalls.

More particularly, the electrical switch aapparatus comprises a substructure common to all phases containing air as an insulating gas and which supports the attachment at the top thereof, the attachment being common to all phases and containing air as an insulating gas. A feedthrough plate is supported over an opening in the top of the attachment and vertically oriented, axially divisible shields detachably fastened at their upper ends to the feedthrough plate extend into the attachment and into the substructure. An electrically conducting plate is connected to the feedthrough plate on the lower side thereof and cable terminations are connected to the conducting plate and extend into the attachment, the cable terminations having screw terminals and being surrounded phase by phase by the shields. A tank forming part of the metal encapsulation is filled with an insulating gas and at least one vacuum switching tube per phase is disposed axially in the tank and centered therein by means of a dish insulator. Seals are interposed between the tank and the upper side of the feedthrough plate, which supports the tank, and between the vacuum switching tube and the feedthrough plate. The vacuum switching tube includes an axially stationary terminal at one end thereof in electrical contact with the cable termination and an axially movable terminal at the opposed end thereof. A lever is coupled to the movable terminal for axially moving the movable terminal, and a shaft linked to the lever is brought out of the encapuslation. A flexible lead is connected at one end thereof to the movable terminal at the other end thereof to a bolt. A bulkhead is disposed at the top of the tank which seals the tank gas-tight and through which the bolt passes. A disconnect switch connected to the bolt and having a movable contact which can be swung within the metal encapsulation into a grounding contact connected to the metal encapsulation and into an opposite contact connected to a bus bar.

These and other aspects of the invention will be more apparent from the following description of the preferred embodiments taken in connection with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENTS

Figures 1, 2:
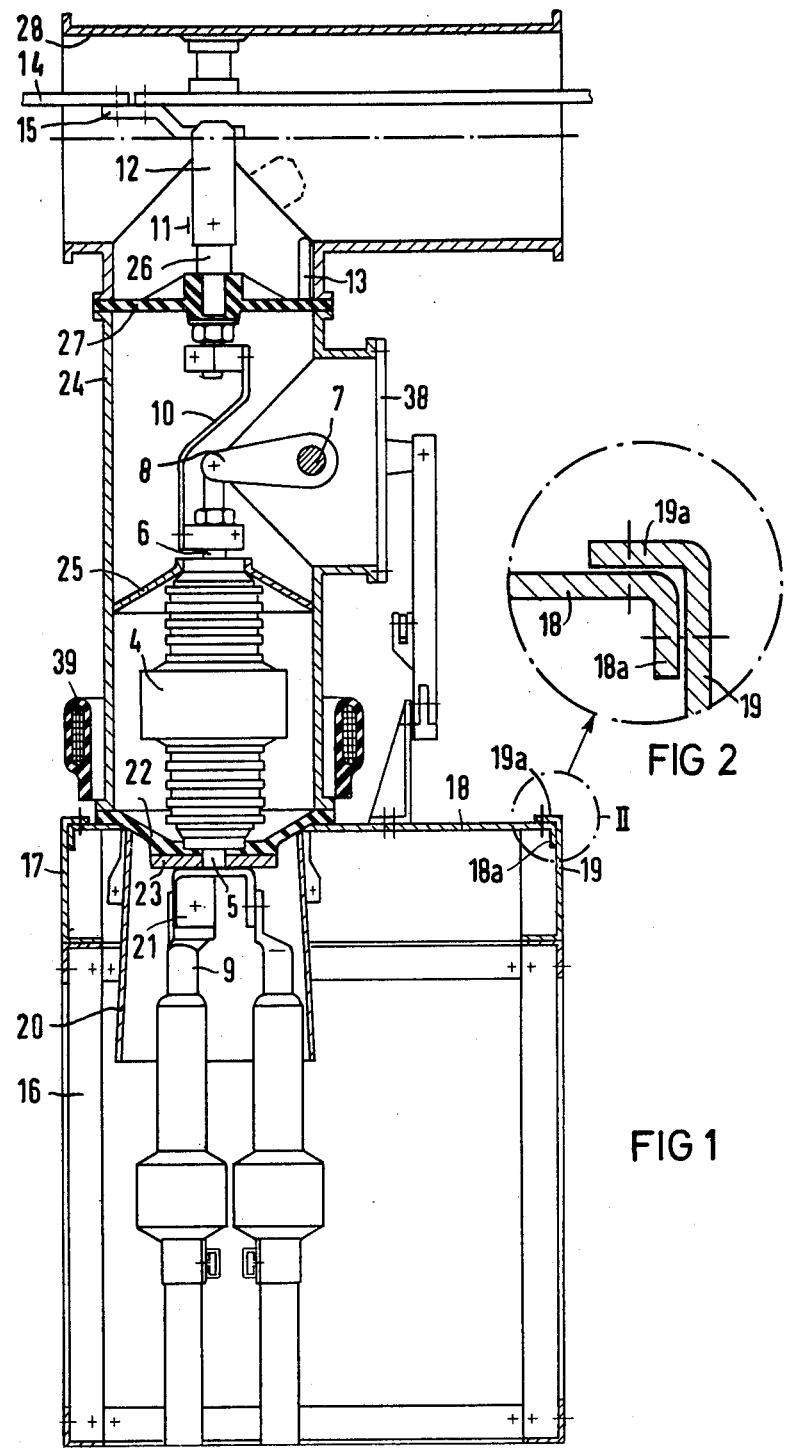
FIG. 1 is an elevation view, partly in section, of switch gear apparatus according to the invention.
FIG. 2 is an enlarged sectional view of a detail of the switch gear apparatus of FIG. 1.

The switchgear apparatus shown in FIG. 1 has a metal encapsulation which is filled with insulating gas in which is disposed at least one vacuum switching tube 4 per phase. The vacuum switching tube 4 is surrounded by a tank 24 which forms part of the metal encapsulation. Insulating material 25 in the form of a dish centers the vacuum switching tube 4 in the tank 24.

The vacuum switching tube 4 has an axially stationary terminal 5 and terminal 6 axially movable by means of a lever 8 linked to a shaft 7 which is brought out of the tank 24. The stationary terminal 5 of the vacuum switching tube 4 is coupled to a cable termination 9 and the movable contact 6 is coupled to a disconnect switch 11 via a flexible lead 10.

The movable contact 12 of the disconnect switch 11 can be swung within the metal encapsulation into contact with a grounding contact 13 connected to the metal encapsulation and into contact with an opposite contact 15 connected to a bus bar 14.

The cable termination 9 is arranged in a substructure 16, which is common to all phases and contains air as the insulating gas. The substructure 16 supports an attachment 17 which also contains air as the insulating gas and is formed by a top 18 and sidewalls 19. The attachment 17 is also common to all phases.

Vertically oriented, axially divisible shields 20 extend into attachment 17 and into the substructure 16, surrounding the screw terminals 21 of the cable termination 9 for each phase. The shields 20 are detachably fastened to the upper end of a feedthrough plate 22 supported by the attachment 17. An electrically conducting plate 23 is disposed on the underside of the feedthrough plate 22, which is connected to the cable terminations 9.

On the upper side of the feedthrough plate 22 rest the end of the vacuum switching tube 4 facing the stationary terminal 5, and one end of the upright tank 24, seals being interposed between the plate 22, the tube 4 and the tank 24. At the top of upright tank 24, a bulkhead 27 is disposed which seals the tank gas-tight. A bolt 26 connected to the flexible lead 10 passes vertically through the bulkhead 27.

The top 18 of the attachment 17 is arranged so that it can be lowered within and/or moved between the sidewalls 19 of the attachment. The top of the attachment and parts of the switch apparatus supported thereby can be lowered in the attachment after the flexible lead 10 has been detached from the bolt 26 and the screw terminals 21 have been disconnected.

When lowered, the top 18 of the attachment 17 together with the parts of the central portion of the switch apparatus supported thereby can be pulled out of the attachment 17 in a transverse direction, i.e., through the front side of the switch apparatus. This arrangement allows separate assembly, alignment and inspection of the central part of the switch apparatus. The central part of the switch apparatus can therefore be completely pre-assembled and tested in the manufacturing process, while the lower part and the top part of the switch apparatus can be assembled in the field to the extent that the central part need only be inserted.

As shown in the drawings by the dash-dotted circles, the top 18 of the attachment 17 has a downwardly-extending edge 18a, which serves for stiffening the top side and could be replaced by ribs.

The edges 19a of the sidewalls 19 of the attachment 17 which are perpendicular to the front side of the switch apparatus are bent inwardly at a right angle and extend over the top 18 of the attachment 17. It is thus possible to fasten the top 18 of the attachment 17 to the inwardly-extending edges 19a of the sidewalls 19, as indicated by the vertical dash-dotted line. The top 18 of the attachment 17 can also be fastened to sidewalls 19 by means of horizontal screws, for example, which go through the edge of the top part 8. In the latter case, vertical slots (not shown) through which the screws pass, can be arranged in the vertical sections of the sidewalls 19.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. An electrical switch apparatus comprising a substructure common to all phases, an attachment common to all phases having sidewalls and a top supported by the substructure at the top thereof, a feedthrough plate supported over an opening in the top of the attachment, a tank forming part of a metal encapsulation filled with an insulating gas supported by the feedthrough plate, at least one vacuum switching tube per phase disposed in the tank, the vacuum switching tube including an axially stationary terminal at one end thereof, a cable termination coupled to the stationary terminal and extending into the attachment, the improvement comprising means on the top of the attachment for detachably connecting the top of the attachment to the sidewalls of the attachment.

2. The improvement according to claim 1, wherein said means permit movement of the top of the attachment out of the attachment in a transverse direction.

3. The improvement according to claim 1, wherein said means permit lowering of the attachment top within the attachment.

4. The improvement according to claims 1, 2 or 3, wherein said means comprise a downwardly-extending edge in the attachment top and edges extending inwardly from the sidewalls at a right angle to the downwardly-extending edge and over the top of the attachment.

5. The improvement according to claim 4 and comprising fastening means for detachably fastening the inwardly-extending edges of the sidewalls to the top of the attachment.

6. The improvement according to claim 4 and comprising fastening means for detachably fastening the downwardly-extending edge of the attachment top to the attachment sidewalls.

7. An electrical switch apparatus comprising a substructure common to all phases containing air as an insulating gas, an attachment having sidewalls and a top supported by the substructure at the top thereof, the attachment being common to all phases and containing air as an insulating gas, a feedthrough plate supported over an opening in the top of the attachment vertically oriented, axially divisible shields detachably fastened at their upper ends to the feedthrough plate and extending into the attachment and into the substructure, an electrically conducting plate connected to the feedthrough plate on the lower side thereof, cable terminations connected to the conducting plate and extending into the attachment, the cable terminations having screw terminals and being surrounded phase by phase by the shields, a tank forming part of a metal encapsulation filled with an insulating gas, at least one vacuum switching tube per phase disposed in the tank and centered therein by means of an insulator, seals interposed between the tank and the upper side of the feedthrough plate and between the vacuum switching tube and the feedthrough plate, the vacuum switching tube including an axially stationary terminal at one end thereof in electrical contact with the cable termination and an axially movable terminal at the opposed end thereof, a lever coupled to the movable terminal for axially moving the movable terminal, a shaft linked to the lever and brought out of the encapsulation, a flexible lead connected at one end thereof to the movable terminal and at the other end thereof to a bolt, a bulkhead disposed at the top of the tank which seals the tank gas-tight and through which the bolt passes, a disconnect switch connected to the bolt and having a movable contact which can be swung within the metal encapsulation into a grounding contact connected to the metal encapsulation and into an opposite contact connected to a bus bar, the improvement comprising means on the top of the attachment for detachably connecting the top of the attachment to the sidewalls of the attachment.

8. The improvement according to claim 7, wherein said means permit movement of the top of the attachment out of the attachment in a transverse direction.

9. The improvement according to claim 7, wherein said means permit lowering of the attachment top within the attachment.

10. The improvement according to claims, 7, 8 or 9, wherein said means comprise a downwardly-extending edge in the attachment top and edges extending inwardly from the sidewalls at a right angle to the downwardly-extending edge and over the top of the attachment.

11. The improvement according to claim 10, and comprising fastening means for detachably fastening the inwardly-extending edges of the sidewalls to the top of the attachment.

12. The improvement according to claim 10 and comprising fastening means for detachably fastening the downwardly-extending edge of the attachment top to the attachment sidewalls.

* * * * *